United States Patent [19]

Hegler et al.

[11] 4,184,831
[45] Jan. 22, 1980

[54] APPARATUS FOR PRODUCING PLASTIC DRAIN PIPES

[76] Inventors: Wilhelm Hegler; Ralph-Peter Hegler, both of 873 Bad Kissingen, Goethe Str. 2, Fed. Rep. of Germany

[21] Appl. No.: 694,414

[22] Filed: Jun. 9, 1976

Related U.S. Application Data

[62] Division of Ser. No. 555,325, Mar. 4, 1975, Pat. No. 4,006,599.

[30] Foreign Application Priority Data

Jun. 20, 1974 [DE] Fed. Rep. of Germany ....... 2429718

[51] Int. Cl.² ............................................. B29D 23/04
[52] U.S. Cl. .................................. 425/290; 425/296; 425/303; 425/326.1; 425/467
[58] Field of Search .................... 264/90, 92, 146, 151, 264/159, 209, 286, 287, DIG. 452; 425/388, 387 R, 327, 326 R, 296, 298, 306, 308, 290, 396, 370, 303; 425/373

[56] References Cited

U.S. PATENT DOCUMENTS

| | | | |
|---|---|---|---|
| 3,391,424 | 7/1968 | Drossbach | 425/370 X |
| 3,538,209 | 11/1970 | Hegler | 264/154 X |
| 3,705,779 | 12/1972 | Zon | 425/326 |
| 3,891,733 | 6/1975 | Maroschak | 264/151 X |

*Primary Examiner*—Mark Rosenbaum

*Attorney, Agent, or Firm*—Sprung, Felfe, Horn, Lynch & Kramer

[57] ABSTRACT

A synthetic plastic drain pipe comprising a continuous pipe of plastic material having transverse, angular or helical corrugations, said pipe having openings for the entry of water, said openings being disposed in said pipe at regular repeating intervals between corrugated lengths of pipe at least at every 20 cm, preferably 30–50 cm, said pipe being free of any opening between said intervals; an apparatus for producing such a synthetic drain pipe, particularly a pipe having distinct portions of general cross section wherein on said portions there are longitudinally running grooves through which there are disposed openings, said apparatus comprising an extruder having an extrusion head, said extrusion head having a generally annular opening defined by a generally circular die disposed about a generally circular mandrel, said apparatus having in general axial alignment with said opening a pair of endless traveling means in the form of a mold train, each of which traveling means carries cooperating mold halves which are in facing relationship generally axial of said opening and joined to define a mold cavity, means for moving said traveling means, means for exerting a partial vacuum on the contents of said mold cavity, some of said molds having grooves to form transversely corrugated pipe lengths of synthetic plastic extruded through said opening, and some of said mold halves having longitudinally running grooves which form longitudinally running grooves in a plastic pipe extruded through said opening.

5 Claims, 13 Drawing Figures

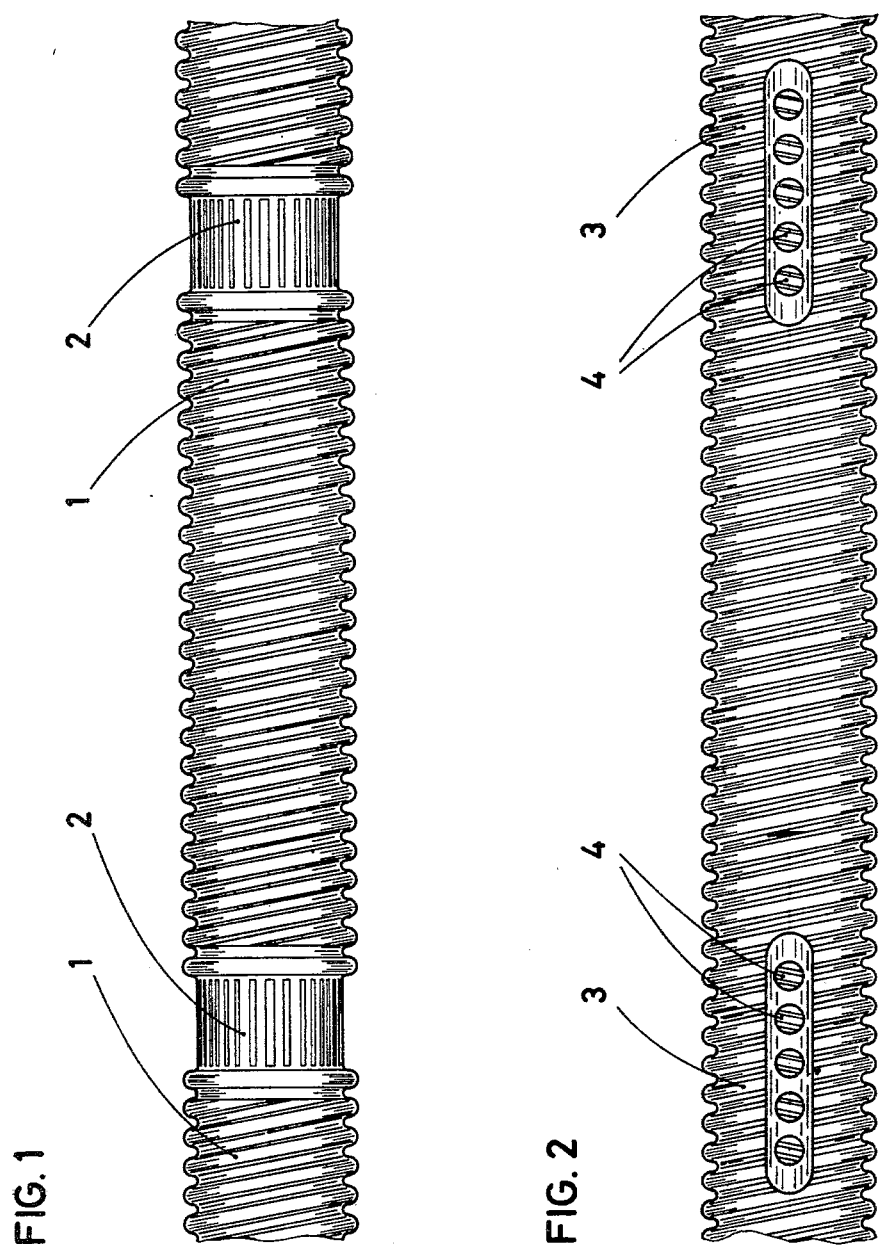

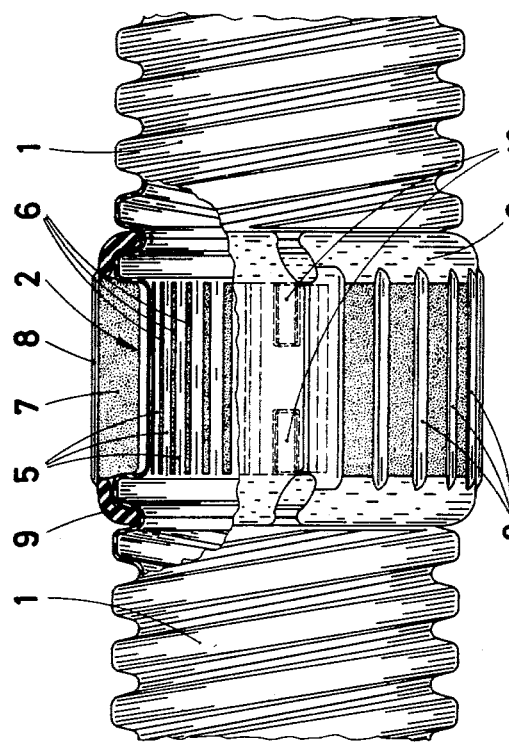
FIG. 3
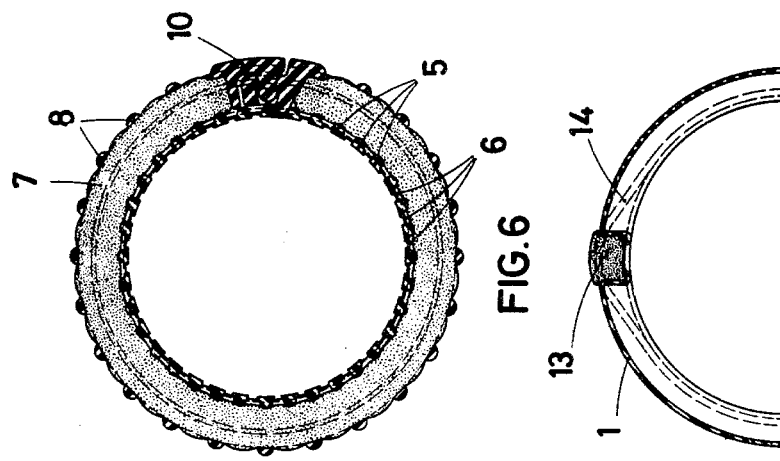
FIG. 4
FIG. 6
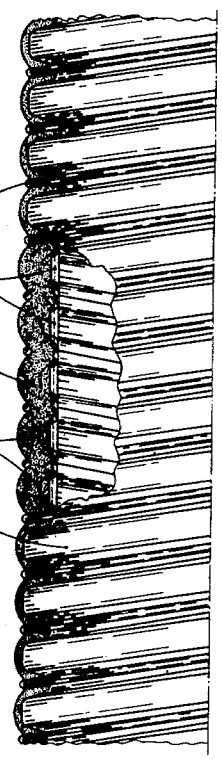
FIG. 5

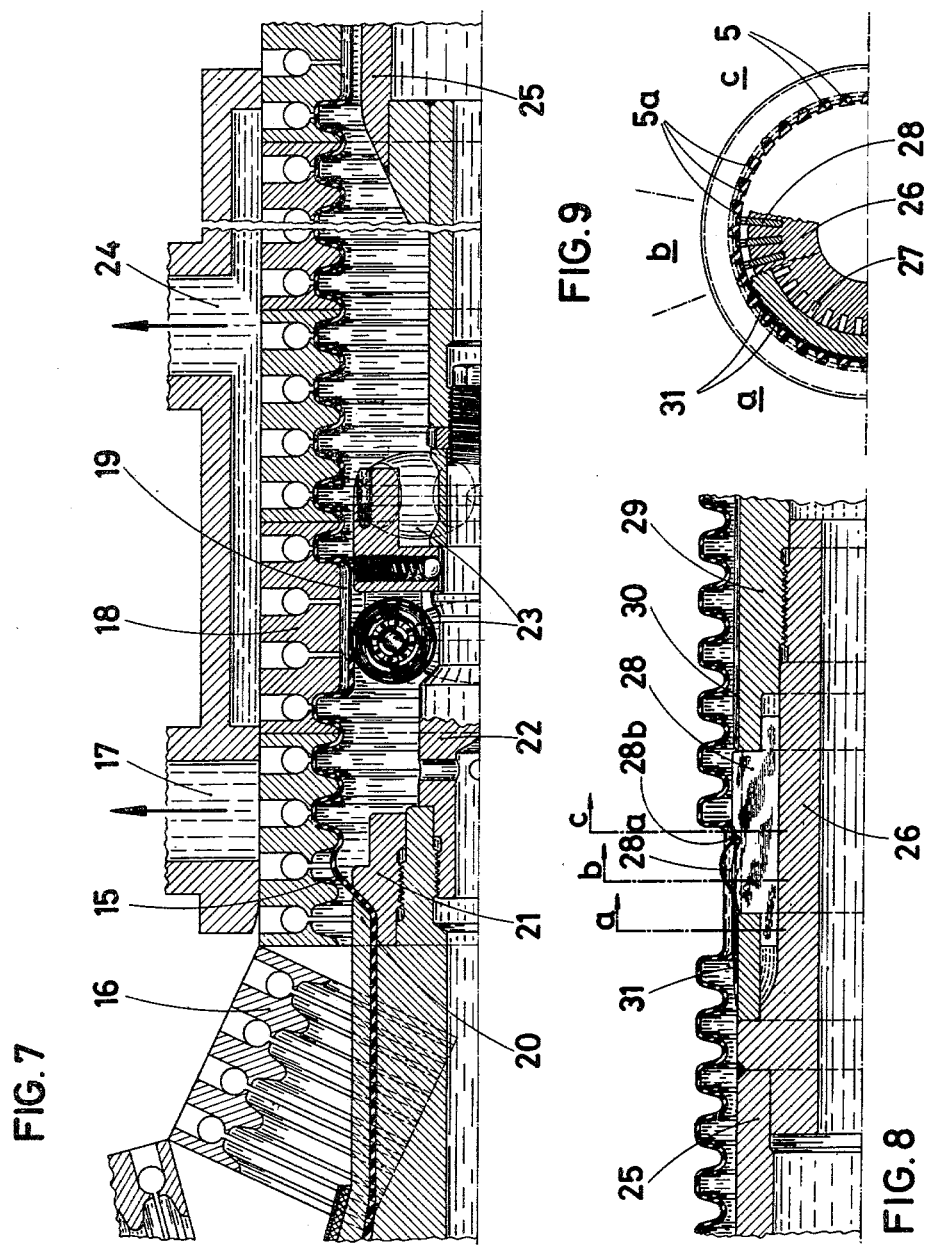

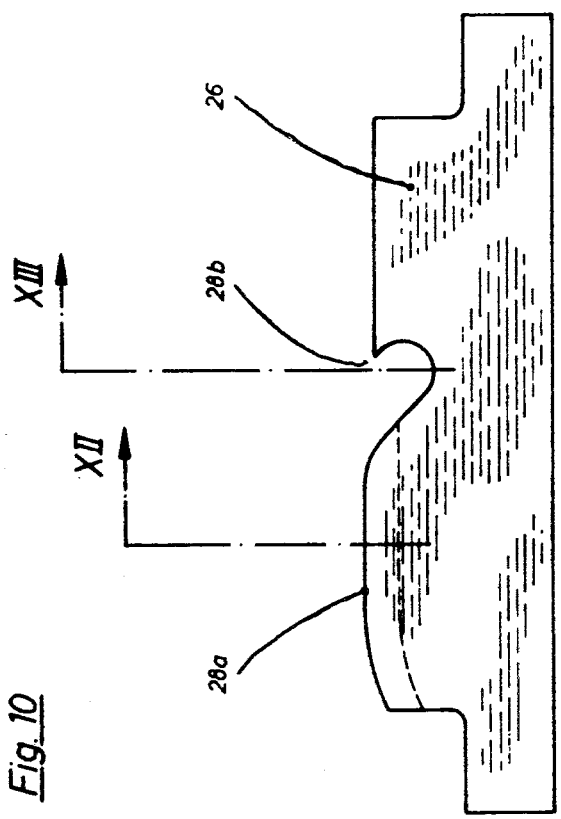
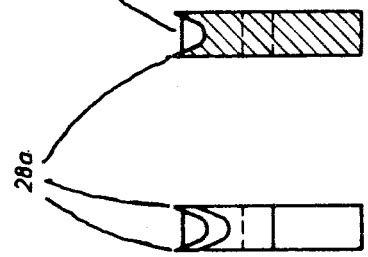
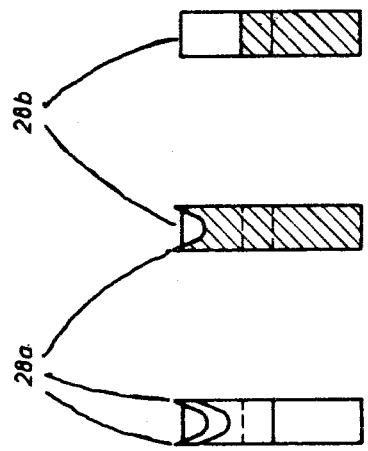

APPARATUS FOR PRODUCING PLASTIC DRAIN PIPES

This is a division of application Ser. No. 555,325, filed Mar. 4, 1975 U.S. Pat. No. 4,006,599, granted Feb. 8, 1977.

BACKGROUND OF THE INVENTION

1. Field of the Invention

This invention relates to synthetic plastic drain pipe. More particularly, this invention relates to synthetic plastic drain pipe in the form of continuous pipe having regions or intervals wherein there are pipe openings, said pipe being characterized by other regions free of openings whereby synthetic plastic pipe of such nature an be employed to remove surface waters and the like wherein free flow of water is maintained through the openings. This invention is also directed to an apparatus for producing types of pipe of the above described nature.

2. Discussion of the Prior Art

It has long been the practice to use burned clay pipes which are about 30 cm long and are laid end to end to permit water to enter the pipe through the gaps at the joints and to be carried away inside the pipe. Naturally, the laying of these clay pipes is a time consuming and wearying operation.

In the course of the last 14 or 15 years, synthetic plastic pipes having transverse corrugations containing cut or punched holes have been more widely introduced. These drain pipes which are supplied in considerable lengths can be mechanically laid without undue waste of time and effort.

However, it has been found that in some soils, particularly soils of a sandy or gravelly nature, the effectiveness of such drain pipes diminishes rapidly. This is due to the fact that the fine particles in the soil accumulate at the water entry openings and eventually obstruct or completely choke them.

A method for obviating this undesirable result is known wherein the openings are covered with a filtering material. However, the effect of the filter-jacketed pipes has been found to deteriorate after a period of time, e.g., two years. While it is not known exactly why the filtering material's effectiveness diminishes, experts in the field believe that this circumstance may be due to the fact that in clay pipes entry of the water is confined to a few specific locations, so that the flow rates of the entering water are higher in a clay pipe than in a synthetic plastic pipe where the water entry openings are uniformly distributed along the pipe length. It is thought that the higher rates of flow keep the entry openings clean.

In order to enable clay pipes to be laid by mechanical means, it has been proposed to join them together with coupling sleeves containing water entry openings, the sleeves being sufficiently flexible to permit consecutive pipe lengths to be laid in polygonal traces. Such a suggestion is found in German Pat. No. 1,298,457. Although this permits the pipes to be laid by machines, there are still various objections. Clay pipes are quite brittle and fragile and necessarily must be connected together bearing in mind these limitations.

It is an object of the present invention, therefore, to provide a drain pipe which combines the advantages of the transversely corrugated pipe, which can be manufactured in considerable lengths and mechanically laid without requiring the additional work of fitting coupling sleeves or the like, which pipe has the advantages of clay pipes by providing for the water entry openings to be kept effectively open and clean.

SUMMARY OF THE INVENTION

The objects of this invention are provided by a synthetic plastic drain pipe comprising a continuous pipe of plastic material having transverse, annular or helical corrugations, said pipe having openings for the entry of water, said openings being disposed in said pipe at regular repeating intervals between corrugated lengths of pipe at least every 20 cm along the length of said pipe, said pipe being free of any openings between said intervals.

The plastic drain pipes of the present invention can take several forms. In a first form or embodiment there is a pipe having sections containing water entry openings, which sections are generally cylindrical, i.e., have a cylindrical cross section. These cylindrical sections are provided with longitudinally running ribs. The water entry openings are defined by the walls of the ribs, i.e., the water entry openings are cut into the pipe wall between the longitudinal ribs. Of particular advantage is a pipe construction wherein the internal diameter of the cylindrical section may be slightly less than the internal diameter of the transversely corrugated portions of the pipe, whereby to enable the water entry openings to be cut into the cylindrical sections by a cutter means located inside the pipe without the remainder of the pipe wall being damaged by the cutters.

In a second embodiment of the invention, the sections containing water entry openings can have transverse corrugations which are peripherally discontinued in one or several portions of the circumference where they are replaced by bosslike elevations which can later be cut off. Preferably, at least those portions of the pipe containing water entry openings are covered with filter material. The filter material can, however, also extend over those parts of the pipe which contain no openings. Indeed, the filter material can take the form of a jacket which surrounds the entire pipe.

If the filter material covers only those parts which contain the water entry openings, then the filter material can be secured by means of a plastic cage. In order to permit this cage to be subsequently fitted, it can be secured by a snap-action fastening or by welding. However, in the case of pipes having helical corrugations, the filter material can be conveniently secured by a cord running around the pipe in the helical corrugations.

The present invention also relates to an apparatus for the production of such a drain pipe. Essentially, the apparatus initially resembles a standard known apparatus for the production of corrugated plastic pipe having transverse or helical corrugations. A mold train comprising a pair of facing mold half traveling units wherein the mold halves are brought together to define a mold cavity is provided in axial alignment with an annular opening defined between a generally circular die and a generally circular mandrel. The mold halves are helically or transversely corrugated to produce helical or transverse corrugations in the pipe.

In one embodiment some of the mold halves are provided with annular or longitudinally running grooves whereby at repeating intervals of the pipe extruded through the annular orifice, the pipe assumes the shape of longitudinally running grooves. Thus, there is produced a pipe which is provided with transverse or helical corrugations interrupted by a portion having longitudinally running grooves. Such a pipe is provided with its water entry openings by a subsequent cutting operation, as by a cutter disposed within the mold cavity whereby the cutter bears against the thin surfaces of the grooves. The apparatus is provided with means for exerting at least a partial vacuum on the contents of the mold as it moves along the common path whereby the contents of the mold tend to be pulled against the wall of the mold and to assume the shape of the mold. The endless sets of traveling mold halves are disposed at the terminal end of the annular opening and act on the extruded plastic material as it passes through the annular orifice and is still hot and in a plastic state.

Another embodiment of the apparatus of the invention is one wherein instead of employing mold halves having longitudinally running ribs, there are provided mold halves which contain transverse or helically running grooves which are characterized in that the transverse or helical grooving is discontinued at one or more places around the internal periphery of the mold, thereby resulting in a gap in the mold surface. This gap provides a pipe which has boss-like elevations which can be readily sheared off in a subsequent cutting operation.

Generally speaking, the regular repeating interval between the zones on the pipe having the water entry opening is at least every 20 cm, generally between 30 and 50 cm, preferably between 40 and 50 cm, i.e., the openings are no more frequent than every 20 cm along the pipe length. In other words, for every meter of drain pipe there shall be provided at best five, but preferably two to three portions, with water entry openings. It will be realized, however, that this distance can vary from pipe to pipe and is selected bearing in mind the amount of surface water to be removed and the nature of the surrounding soil.

The loss of material due to the cutting out of water entry openings reduces the mechanical strength of the pipe. In the first above embodiment comprising cylindrical pipe sections this reduction in strength can be minimized by reducing the thickness of the wall portions which are to be cut out for forming the openings, so that the actual quantity of material removed is slight and the ribs between the openings are correspondingly thicker. In order to displace the material away from the portions that are to be cut out, it is proposed to provide crowned rollers in the path of the traveling molds, said rollers being adapted to press the pipe wall of the cylindrical sections against the internal surface of the interposed molds and thereby to displace the material into the grooves forming the ribs while simulatenously rolling down the webs between the ribs to the thickness of a wafer-thin film.

For cutting out the wafer-thin webs to form openings, cutter means are provided inside the pipe at a point where the pipe has already emerged from the opening molds. Conveniently the cutter means are arranged first to slit the wafer-thin wall portions lengthwise and then to cut off the resultant ribbon at each end while pressing it outwards.

For the purpose of locating the pipe, particularly where it emerges from the separating mold halves, a locating tube projecting beyond this point can be provided. This locating tube can incidentally also be used for mounting the cutters which cut the water entry openings. Moreover, to prevent the pipe from undesirably turning, the locating tube can project beyond the point where the openings are cut and there be provided with longitudinal ribs which engage the cut out openings and thus prevent the freshly formed pipe from turning.

BRIEF DESCRIPTION OF DRAWINGS

The present invention can be more readily understood and appreciated when reference is made to the accompanying drawings showing embodiments of drain pipes according to the invention and apparatus for producing such pipes. Referring to such drawings:

FIG. 1 is a first embodiment of a drain pipe according to the invention;

FIG. 2 is a second embodiment of such a pipe;

FIG. 3 is a part of a drain pipe according to FIG. 1, on a larger scale, showing a filter in place, part of the pipe being broken away for clarity;

FIG. 4 is a cross section of FIG. 3 in a plane intersecting the filter;

FIG. 5 is a larger scale similar view of a drain pipe according to FIG. 2;

FIG. 6 is a cross section of that part of the pipe in FIG. 5 which contains the water entry openings;

FIG. 7 is apparatus adapted to the production of a pipe according to FIG. 1;

FIG. 8 is part of the apparatus adjoining FIG. 7 and comprising the means for cutting the openings;

FIG. 9 is a cross section of FIG. 8 in which sector a is a section on the line a in FIG. 8, sector b is a section on the line b in FIG. 8, and sector c is a section on the line c in FIG. 8;

FIG. 10 is a side view of a cutter blade in the embodiment according to FIGS. 7 and 8, on a larger scale;

FIG. 11 is a view of the cutter blade seen from its left hand end in FIG. 10;

FIG. 12 is a section of the cutter blade in FIG. 10, taken on the line XII; and

FIG. 13 is a section of the cutter blade in FIG. 10, taken on the line XIII.

DESCRIPTION OF SPECIFIC EMBODIMENTS

Referring to FIG. 1, there is shown a drain pipe having a pipe length 1, which pipe length has pipe walls helically corrugated. It can be produced by a conventional molding process as disclosed in the art. The drain pipe is, however, characterized by containing longitudinal ribs between grooves, which ribs contain slots through which water can enter the pipe. The drain pipe is characterized by the fact that there are no entry openings for water in certain sections, and there are intervening portions 2 which have a cylindrical cross section and contain the longitudinal ribs. It is through these intermediate portions where the openings in the pipe are provided.

FIG. 2 is a different form of construction in which the pipe wall is continuously helically corrugated. In sections 3 the crests of the helical corrugations are discontinued in a particular portion of the pipe circumference to form a flat on the pipe wall containing water entry openings 4 which can be produced by the formation at these points, during the production of the pipe, of boss-like elevations which are later shaved off. The lengths of the transversely corrugated pipe portions free of water entry openings, which in both instances extend from each section containing the described entry openings to the next section, should, preferably, be between 40 and 50cm. Apart from other factors, this length also depends upon the rate at which water is to be extracted from the soil by the drain.

FIGS. 3 and 4 show a pipe 1 according to FIG. 1 on a larger scale. The diameter of the cylindrical portion 2 is slightly less than the minimum diameter of the transversely corrugated lengths 1. The transverse corrugations need not necessarily be helical. They may in fact be annular corrugations, although the helical configuration has the advantage of readily permitting the pipe ends to be coupled by screw-on sleeves. The final circular groove at the ends of the lengths 1 merges into the cylindrical section 2 which is formed with the longitudinal ribs 5 between which the water entry openings 6 are situated.

The cylindrical part 2 is embraced by a filter element 7. This is held in position by a cage which consists of longitudinal ribs 8, ring-shaped fittings 9 interconnecting the ribs and a snap-action fastening 10. Instead of using a snap-action fastening any other type of connecting means can be used, or the cage can be secured by welding. The filter can be a soft polyurethane foam or like material which passes the silt contained in the soil so that flow which concentrates into the cylindrical slotted tube sections will continuously flush the water entry openings and keep the filter material clean. A natural soil structure will thus gradually build up and when this has been formed, satisfactory and uniformly functioning drainage will be assured for a long time.

FIGS. 5 and 6 illustrate part of the drain pipe according to FIG. 2 on a larger scale, only the upper half of the pipe being shown. The helical transverse corrugations are discontinued in the section shown broken away in FIG. 5, and in this part a number of bosses 11 are formed which are indicated in dotted lines because in the finished pipe they are absent. These bosses are cut off to create the water entry openings 12 in a flat bearing surface for the filter 13.

As illustrated in FIG. 6, the filter may be inserted into the space created by the discontinuation of the transverse corrugations. Alternatively, as will be understood from FIG. 5, the entire pipe can be covered by a filter strip which is ineffective on the transversely corrugated lengths which lack water entry openings, and which filters only where the entry openings 12 are situated.

For securing the filter, cord 14 runs around the pipe in the helical corrugation. This kind of filter has the advantage that the filter strip can be continuously run on the pipe during production. Location of the filter by a cord wound around the pipe in the bottom of the valleys of the helical corrugations is also suitable for location of the filter in FIGS. 3 and 4 instead of by a cage.

Pipes of the kind illustrated in FIGS. 1, 3 and 4 can be produced in apparatus of the kind illustrated in FIGS. 7 to 9. The apparatus illustrated in FIG. 8 is a continuation of the right hand end of the apparatus in FIG. 7, some of the intervening part being omitted. In a manner which, as such, is known in the art, the warm and still plastic pipe 15 issuing from the mouthpiece 20 over the mandrel 21 of an extruder enters the molding cavity formed between two trains of interlinked half molds of which only the upper train of half molds and the corresponding half of the extruded pipe are shown. The complete mold is formed when the half molds 16 have closed. They contain grooves from which air is abstracted at 17 to draw the extruded plastic pipe wall into molding contact with the grooves in the mold walls.

FIG. 7 shows molds for forming annular transverse corrugations. Helical corrugations, such as those illustrated in FIGS. 1 and 3, would require the use of corresponding molds containing helical grooves. Interposed between these normal divided molds 16 at intervals of about 30 to 50 cm is a special divided mold 18 which lacks transverse grooves and which instead is formed with longitudinal grooves 19 for the formation of longitudinal ribs 5.

An extension 22 is screwed to the extruder mandrel 21 and this extension carries relatively offset crowned rollers 23. These rollers operate to press the hot plastic material against the mold 18 and to displace the hot plastic material out of the narrow lands between the longitudinal grooves 19 into the latter, so that the resultant longitudinal ribs 5 will be separated by grooves where the wall thickness is only as thick as a wafer film. In conventional manner, air continues to be exhausted at 24. Consequently, the still plastic pipe is drawn into contact with the mold walls until the pipe wall is sufficiently consolidated by the cooling of the molds.

When the pipe has become sufficiently well solidified by the cooling effect, the mold halves in apparatus of the described kind open. However, whereas in the case of conventional pipes which have merely been formed with transverse corrugations the molds can readily separate, the grooves in the molds 18 in the present invention do not readily detach themselves from the pipe because the flanks of the upper and bottom ribs 5a project at an angle upwards into the molds. The still warm and elastic pipe is deformed into ovality as it is released by the mold halves. Moreover, in order to prevent the pipe from being laterally entrained by one of the mold halves during this process and thus damaged, the mandrel extension 22 carries a locating tube 25 which projects beyond the point not shown in FIG. 7 where the mold halves separate, and which has an external diameter that falls short of the internal diameter of the cylindrical portions of the pipe sufficiently not to impede the deformation of the pipe into ovality but yet to prevent it from being laterally deflected.

As will be understood by reference to FIG. 8, this locating tube 25 threadedly carries a cutter holder 26. Knife blades 28 which serve for cutting the longitudinal openings 6 are fitted into radial slots 27 in the cutter holder 26, as will be seen more particularly in FIG. 9. According to FIGS. 10 to 13, the cutter blades each contain two cutting side edges and a transverse cutting edge 28b. The cylindrical parts of the pipe, which is assumed in FIGS. 8 and 10 to move from left to right, is first longitudinally slit by the side cutting edges 28a, thus between the ribs 5 cutting out wafer-thin ribbons which are then cut out first at their leading right hand end by the transverse cutting edge, forced upwards and finally cut off at their left hand trailing end. The described shape of the knife blade insures that the cut out ribbons are all or mostly ejected outwards, and that only a very minor proportion drops into the pipe interior.

If, as is the case in FIGS. 4 and 9, the longitudinal ribs are close together it is important to insure that the knife blades are exactly located where the pipe wall between the ribs has been rolled down to wafer thinness, and that the blades will not cut into the ribs 5 from the inside as a result of the pipe having slightly turned about its longitudinal axis. For this purpose an additional locating tube 29 is provided in the direction of travel of the extruded and formed pipe behind the cutter holder 26.

This additional tube is provided with longitudinal ribs 30 which are adapted to engage the slits cut by the blades into the cylindrical part of the pipe.

This locating pipe 29 is conveniently of a length which will insure that the preceding cylindrical portion 5 will still be located by the ribs of the tube 29 when the next cylindrical portion 2 is still at the cutter holder 26. Similar ribs 31 may also be provided on the cutter holder preceding the cutter blades in such manner that these ribs will press into the yielding wafer-like webs between the ribs 5 and thus improve angular location. It is unnecessary to provide a locating rib in respect of each slit. It is quite sufficient to have a few such ribs around the circumference, for example angularly sufficiently widely spaced for one rib to cooperate with each third or fourth slit, or to provide groups of three to four ribs on two diametrically opposite sides or in three or four equidistantly spaced regions.

From the right hand end of the locating tube 29 which is not shown in the drawings the finished pipe leaves the apparatus and can be coiled up as is conventional.

A similar apparatus can be used for the production of the pipe shown in FIGS. 2, 5 and 7. In this case, the special molds 18 intervening between normal molds 16 are also provided with transverse grooves like the normal molds 18. However, at one point around the inside circumference or possibly at several such points, the grooves in the mold which give rise to the crests of the corrugations in the pipe are discontinued and recesses are formed in the gaps between the ends of the corrugations to give rise to the formation of the bosses 11. In order to insure that these bosses will be well formed, particular attention must be paid to a good evacuation of the recesses. The separation of the divided molds in this arrangement causes no difficulties if the areas where the transverse grooves are discontinued are located on the sides, permitting the mold halves to lift away cleanly. After the mold halves have separated the pipe passes through a cutter arrangement comprising a movable knife which is lowered when a portion 3 passes this cutter device, and which thus shaves off the bosses. Following the cutter device means can be provided for fitting the filter which may be either continuously applied in the form of a filter band 13 or intermittently only to the portions 3. Finally, a rotating winding arrangement which winds a cord 14 about the pipe may be provided. A similar device can also be associated with the apparatus according to FIGS. 7 and 8 if the filter is to be secured by a wound cord rather than by a filter cage. The application of filter cages of the illustrated kind is effected by a special mechanism which forms no part of the present invention.

The presence of the cylindrical portions only insignificantly affects the flexibility of a pipe according to FIG. 1. In the embodiment according to FIG. 2, the flexibility of the pipe is not impaired at all, although the vertical compressive strength of the pipe may be somewhat reduced. Hence, both pipes can be mechanically laid in the same way as conventional transversely corrugated synthetic plastic pipes. At the same time they share the advantage of clay pipes joined by perforated flexible sleeves of concentrating the entry of water within the defined areas and thereby insuring that the entry openings and filters will always be flushed clean.

There is thus provided a synthetic plastic drain pipe which is continuous. It is continuous in the sense that the portions of the pipe which contains the openings are integral with and co-molded with the portions which are free of openings. This pipe is distinguished from any pipe wherein a separate opening section might be inserted into a standard pipe having transverse or helical corrugations, as by a threaded connection. This is a particular advantage in that the pipe can be made by a continuous process. It is made of the same material, and thus the pipe material at the portions wherein there are openings has substantially the same physical properties as the sections of pipe which are free of openings. This is of advantage in that it is assured that the pipe will respond to temperature and pressure in the same way. Thus, repeated freezing and thawing will not effect an opening of the pipe at a place wherein an opening is not desired. Other advantages of this continuous integral structure will be apparent to one of skill in the art from the disclosure above.

It will be realized that the perforated pipe of the invention can be used in the drainage of numerous surfaces such as agricultural lands, roads and motor highways, railroad beds, airport runways and the like. The total aperture area per length of pipe will vary depending upon the pipe end use. For instance, a pipe to be used in railroad bed drainage will have a minimum entry area of at least 15 $cm^2$ per meter, preferably 20 $cm^2$/meter. A pipe used in street or highway drainage will have a minimum entry area of 40 $cm^2$/meter, preferably at least 50 $cm^2$/meter.

What is claimed is:

1. In an apparatus for producing a drain pipe having annular or helical corrugations and having openings for the entry of water in distinct portions being disposed in said pipe at regular repeating intervals between corrugated lengths of pipe, said apparatus comprising an extruder having an extruder head, said extruder head having a generally annular opening defined by a generally circular die disposed about a generally circular mandrel, said apparatus having in general axial alignment with said opening a pair of endless travelling means in the form of a mold train, each of which travelling means carries cooperating mold halves which are in facing relationship generally axial of said opening and joined to define a mold cavity, means operatively associated with said mold cavity for exerting a partial vacuum on the contents of said mold cavity, some of said mold halves having grooves to form transversely corrugated pipe lengths of synthetic plastic extruded through said openings, the improvement wherein some of said mold halves have a cylindrical mold cavity, the internal diameter of the cylindrical sections being slightly less than the internal diameter of the transversely corrugated portions and a fixedly disposed pipe cutter means located inside the pipe and in the direction of travel downstream of the point where the mold halves separate, said fixedly disposed pipe cutter means engaging said cylindrical sections as they pass thereover but being in out of contact relationship with said transverse corrugated sections as they pass over, said mold halves being disposed on opposed sides and urging said pipe over said fixedly disposed pipe cutter to cut an aperture in said pipe no more frequent than every 20 cm of pipe length.

2. An apparatus according to claim 1 wherein disposed in the path of travel of said mold halves within said mold cavity having longitudinally running grooves there is a crowned roller over which softened synthetic plastic pipe having a generally cylindrical cross section and longitudinally running grooves can pass, said roller being so dimensioned that it exerts a pressure against the internal pipe wall of the section of pipe having longitudinal grooves whereby to force the plastic material into the grooves of the mold halves while simultaneously rolling down the webs between ribs to a wafer-thin film.

3. An apparatus according to claim 1 wherein said apparatus has a cutter holder for knife blades mounted on a first locating tube disposed in axial alignment with said mold train.

4. An apparatus according to claim 3 wherein a second locating tube is disposed beyond the point where the openings are cut and is provided with longitudinal ribs which engage said openings.

5. An apparatus according to claim 1 further comprising a first locating tube in the path enclosed by the travelling mold halves while in facing relationship with one another, which locating tube projects beyond the point where the mold halves separate.

* * * * *